July 25, 1967  D. C. WHITTLEY  3,332,644
AUGMENTOR WING SYSTEM FOR TRANSPORT AIRCRAFT
Filed April 29, 1966  2 Sheets-Sheet 1

INVENTOR:

DONALD CHARLES WHITTLEY

BY: *Cavanagh & Norman*

July 25, 1967  D. C. WHITTLEY  3,332,644
AUGMENTOR WING SYSTEM FOR TRANSPORT AIRCRAFT
Filed April 29, 1966  2 Sheets-Sheet 2

INVENTOR:
DONALD CHARLES WHITTLEY
BY: Cavanagh & Norman

3,332,644
AUGMENTOR WING SYSTEM FOR TRANSPORT AIRCRAFT
Donald Charles Whittley, Islington, Ontario, Canada, assignor to The De Havilland Aircraft of Canada, Limited
Filed Apr. 29, 1966, Ser. No. 546,427
4 Claims. (Cl. 244—42)

The invention relates to a system and method for generating lift over an airfoil section substantially independent of the forward speed of an aircraft having a jet power plant, and is a continuation-in-part of the copending application entitled Intermediate Lift System for Jet Aircraft and Method, filed August 29, 1963, Serial No. 305,264.

The aircraft herein disclosed may for convenience be classified as a V/STOL type and is adapted at cruising and higher speeds to operate according to performance characteristics of conventional jet aircraft wherein the jet power plant generates thrust in the main horizontal propulsive jet stream emerging directly from the power plant, and the wing structure in its contours provides for lift.

Prior attempts to provide a jet aircraft driven at cruising and higher speeds in whole or in part by jet streams emitted from the trailing edge of the wing structure should not be aerodynamically or operationally confused with the present invention because the present invention provides for conventional aerodynamic structure and function in this portion of flight.

The aircraft of the invention includes in its power plant provision for substantial bypass air which in normal cruising and high-speed flight is entirely fed into the main propulsive jet stream but which during operations of takeoff or in the later stages of landing procedures is diverted and utilized entirely within the wing structure to capture upper and lower surface air from the surface of the wing in such manner as to accelerate and increase the flow of air over such surfaces, and to direct such substantial additional volumes of air downwardly through the wing by shroud structure defined by flap means forming a diffuser which is controllable to provide a lifting thrust, the pitching moment of which is substantially balanced by a nose-up moment on the airfoil section derived from a greater increased flow of air over the upper surface than over the lower surface.

While downward thrust fan systems have been provided heretofore in combination with wing structures to effect a vertical lift component even to the extent of direct vertical takeoff, such prior systems are not directly compatible with those conditions encountered in the final stages of an approach for landing such as is required to be made by a short landing type of aircraft of relatively large aspect ratio in the wing structure. What is required and that which is provided by this invention is the controllable capturing and directing of large quantities of upper and lower surface air about the wing into a downwardly and rearwardly controllable jet thrust stream thus to provide a vertical thrust component which increases as the main power plant horizontal thrust component is decreased, by the removal of bypass air therefrom other conditions being constant, thus enabling a smooth change in lift-thrust conditions of the aircraft for takeoff and landing at low speeds.

The invention also contemplates the utilization of one or more jet power plants such as two mounted on the wing on opposite sides of the fore and aft plane of symmetry and at equal distance from the plane respectively but having bypass air generated by each power plant and controllably communicable from each power plant to the main jet stream thereof or alternatively to the internal jet streams in the structure of said wings equally on both sides of the aircraft, whereby a failure of one of the said power plants at any point of control will affect the jet streams on both sides of the aircraft identically and automatically without calling for any special emergency measure by the operator.

It is to be recorded that upper or lower surface air has been used heretofore for changing aerodynamic characteristics. For example, Steinmetz, employed an external lower surface venturi for drawing on upper surface air to control aerodynamic characteristics. Also, Henri Coanda is a recognized authority in the provision of so-called Coanda slits in external wing trailing edges for providing a driving thrust by utilizing an external entrainment phenomenon of air caused to pass over a curved surface sometimes described as a Coanda effect and which gives rise to controllable aerodynamic characteristics. Such, however, are directed to external generation of thrust for free flight purposes, that is, at crusing and higher speeds and are intended to replace, in the main, the thrust effect of the main jet stream of the power plant during high-speed flight. In addition, Robert Pouit is a proponent of high-speed flight utilizing upper surface air in combination with external Coanda slits over a flap structure whereby the flap structure may also be employed to provide a downward thrust component while changing the aerodynamic characteristics by evacuating the leading edge of the wing to maintain stability presumably during the final stages of landing procedures at which point stability is most difficult. Furthermore, Arthur D. Wood has proposed the utilization of upper and lower surface boundary air with an external Coanda slit in such manner as to divert the same but by exterior surface entrainment only, thus to provide a redirection of such external air by virtue of the Coanda effect in the form of a redirected motion of the air stream rather than a jet stream of any kind.

In addition to the above Bertin & Company of France have proposed methods for utilizing double flaps to provide along with a jet augmentation system, lift as well as thrust in combination with the conventional wing surface. These investigations however are mainly directed toward jet augmentation systems movable to be directed downwardly to provide additional lift, presumably at lower speeds such as landing and takeoff. It should be noted however that the provision of a downwardly deflected augmentation system is not new and that while Bertin & Company provide for various combinations of augmentation systems with movable flaps, these in general disclose the single principle of directing the effort of the augmentation system and by various means.

According to the invention a different kind of Coanda slit is provided internally in a wing structure in a through wing gap between a rigid wing portion and a movable wing portion. The movable wing portion comprises upper and lower flap assemblies movable relative to the fixed wing portion to provide two modes of operation, namely that of pure thrust augmentation and combined lift-thrust augmentation according to the particular setting of the movable assemblies of the wing structure.

In the past the use of high lift co-efficients derived from fans in the wing or downwardly directed jet streams resulted in a far aft position of the centre of pressure thus introducing a serious control problem. While, according to the thrust augmenting system of this invention the centre of pressure might likewise be expected to be moved rearwardly of the desired location for the centre of pressure; the invention compensates for this condition by providing for a greater opening for inducted air from the upper surface by way of the upper flap than from the lower surface by way of the lower flap. Thus the invention draws additional air over the wing surface by different induction of large quantities of upper and lower surface air through said gap to generate a nose-up moment. This results in a shifting forward of the centre of pressure position as the speed of surface airflow increases thus assisting trimming at dynamic pressures as low as two pounds per square foot, representing a low forward speed of the order of about 25 miles per hour. The additional lift factor becomes significant as a lift factor at about 50 miles per hour and rapidly increases above that speed. Above about 50 miles per hour the centre of pressure remains constant in its location until in free flight at cruising and higher speeds with all flaps closed, it is contained in the position determined by the usual aerodynamic characteristics of the airfoil design contours.

Having regard to the foregoing it is another object of this invention to provide a novel internal Coanda slit wing structure adapted to entrain upper and lower surface air from the wing surfaces wherein a scoop flap of the invention is employed for scooping large quantities of air from the upper surface of the wing for downward entrainment by internal Coanda slits in the wing.

Other objects of the invention will be appreciated by a study of the following specification taken in conjunction with the accompanying drawings.

Figure 1:
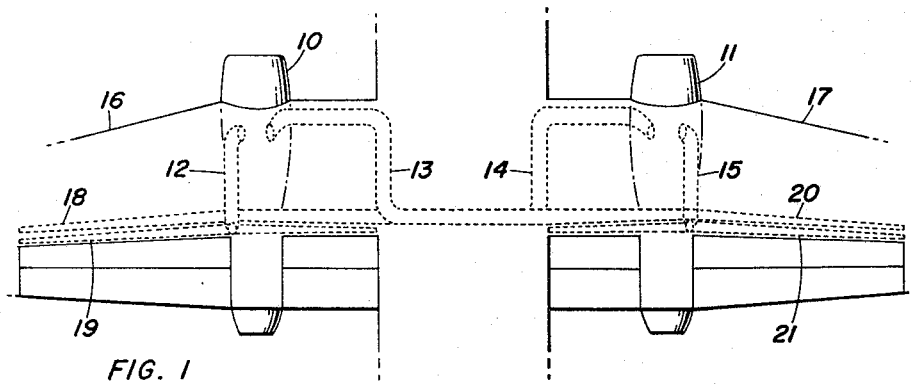
FIGURE 1 is a top plan view of a portion of an aircraft wing structure showing the arrangement of bypass air from the jet engines directed along the span of the wings.

Referring to FIGURE 1, it will be seen that the invention provides for utilization of auxiliary or bypass air from the jet engines 10 and 11 ducted in the case of engine 10 by piping 12 and 13, and in the case of engine 11 by piping 14 and 15, spanwise along both wing sections 16 and 17 whereby both engines 10 and 11 supply air to the augmentation system within the wing panels.

Figure 2:
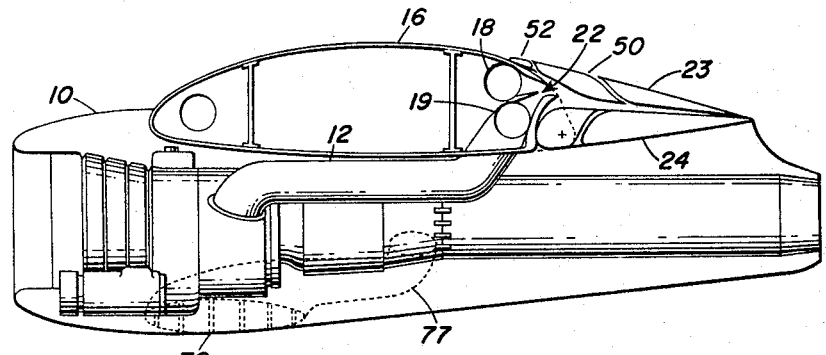
FIGURE 2 is a mid vertical section through a wing as shown in FIGURE 1 and shows the general arrangement of bypass air duct to the spanwise slit utilized in the present invention.

In this configuration it is preferable to provide two air supplies 18 and 19 in wing panel 16 and 20 and 21 in wing panel 17. These being preferably located one above the other as shown in FIGURE 2. A spanwise nozzle as at 22 is provided and upon operation of this system directs bypass air rearwardly to be directed by upper flap assembly 23 and lower flap assembly 24 in the manner to be described. The necessary valving to control the airflow will, of course, be incorporated on a specific installation, however as has been stated, the views are diagrammatic in nature and illustrate the operative portions of the augmenter wing system other operational items and features being well known in the art.

Figure 7:
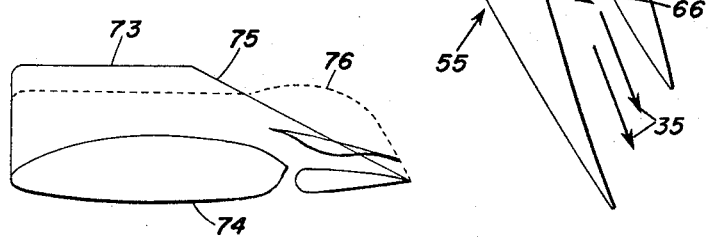

FIGURE 7 is a trend curve of pressure coefficient showing a conventional upper surface pressure distribution at a design lift coefficient for flight at high subsonic speeds. The chain line curve illustrates the improvement of the invention when operated during cruise in the configuration of FIGURE 3.

In some applications it is desirable to deflect the horizontal thrust (see FIGURE 2, duct 77 and nozzle 78); this is particularly important for landing so as to obtain a steep approach path. In this case it is preferable to supply the bypass flow unevenly to compensate for any rolling moment deriving from a condition where one engine has ceased to operate and the other is continuing. The amount of uneven distribution required from the continuing engine is quite small because of augmentation of lift developed by the wing sections in any case. However for added safety in the event of engine failure it will be understood that each of the engines shown may be replaced by two engines though the uneven supply of distributed gases compensates for the moment condition which can arise due to the failure of one engine.

Figure 3:
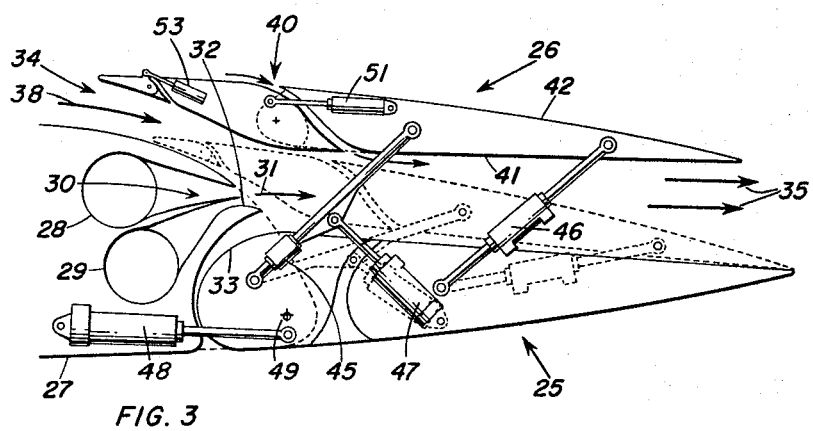
FIGURE 3 is a diagrammatic section through a wing structure according to the present invention and illustrates the configuration for pure augmentation mode for the system.

Referring to FIGURE 3 one embodiment of the flap assembly portion of the invention is illustrated and shows a lower flap assembly indicated generally as 25 and an upper flap assembly indicated generally as 26 moveably supported on the fixed portion 27 of a wing structure. The spanwise ducts 28 and 29 convey air to the spanwise jump Coanda nozzles 30 which during operation directs air rearwardly as indicated by the arrow 31. Possibly a lower lip 32 forming an integral part of the nozzle 30 may aid in directing the flow from the nozzle onto the Coanda surface as provided by the lower flap assembly 25 at 33.

FIGURE 3 illustrates the thrust augmentation mode of the system wherein the slot as at 34 is opened, the flap angle in this case being zero. By resort to the configuration as shown in FIGURE 3 the augmentation system can be put into operation before utilization of the flap arrangement for low speed flying. A smooth transition from normal flight to low speed flight for landing can best be achieved, the changeover of the thrust from the main engines to the wing augmenter system being done at zero flap, which further provides for smooth transition from high to low speed flight.

Figure 4:
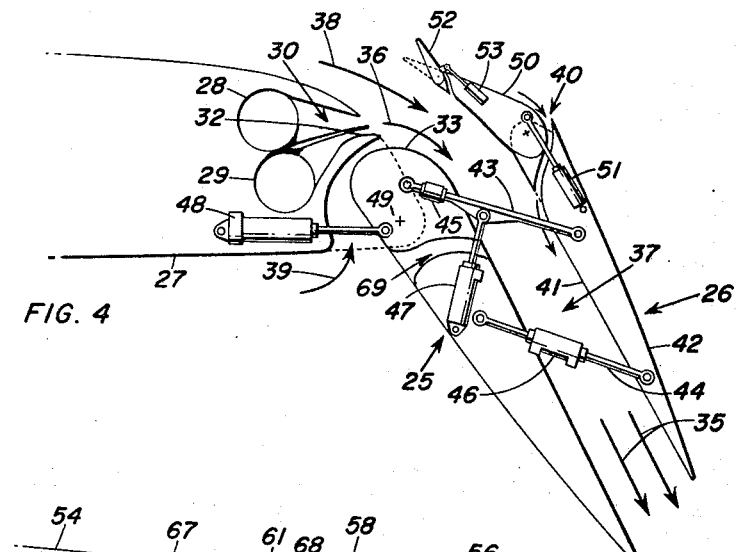
FIGURE 4 is a diagrammatic view of the structure as shown in FIGURE 3 but in the lift assist attitude wherein the flap portions are directed downwardly and rearwardly to assist in thrust as well as lift.

In FIGURE 4 the flap down position of the arrangement of FIGURE 3 is shown and it will be seen that the augmented thrust as indicated by the arrows 35 is directed downwardly and rearwardly to provide lift and thrust simultaneously. With the assemblies in this position, the jump Coanda surface 33 curves the airstream as indicated by the arrow 36 from the nozzle 30 downwardly through the augmenter section at 37 to entrain the air from above the wing surface as indicated by the arrow 38 and to entrain air from below the flap assembly 25 as indicated by the arrow 39.

It is of importance to note that the Coanda surface 33 rotates with the lower flap assembly 25 which maintains close design conditions for intermediate flap angles. In addition, the preservation of the flap assembly geometry during all angles of flap deflection enhance the ability of the flap arrangement to generate high lift with low drag or high lift together with high drag at the very high flap angles. By combining the rotatable Coanda surface together with a constant flap and augmenter geometry smooth transition from high speed to low speed flight and the reverse condition when moving from low speed to high speed flight is greatly simplified.

The additional slot as indicated at 40 in the upper flap draws in air over the surface 50 which in turn helps the flow to proceed around the curved surface and thus maintains attached flow over the surface 42 of the upper flap up to substantially extreme flap angles.

The upper flap assembly 26 and the lower flap assembly 25 are operably linked together by means of the struts 43 and 44, these struts being provided with extension, retraction units 45 and 46 respectively whereby the spacing between both flap assemblies and thus the area of the diffuser section 37 can be altered and in addition the included angle of the diffuser section 37 can be altered. The extension units 45 and 46, as well as the extension unit 47 can be either hydraulically, pneumatically, or electrically operated this being a matter of design choice. The main actuation of the flap system is effected through the jack 48 and the lower flap assembly 25 is hinged about the point 49 which is the centre of rotation for the Coanda surface 33.

The upper flap assembly 26 is provided with an upper fore-flap 50 operably linked to the flap 26 by means of the jack mechanism 51 and provided with a hinged tip 52 this being operated by the jack mechanism 53.

Figure 5:
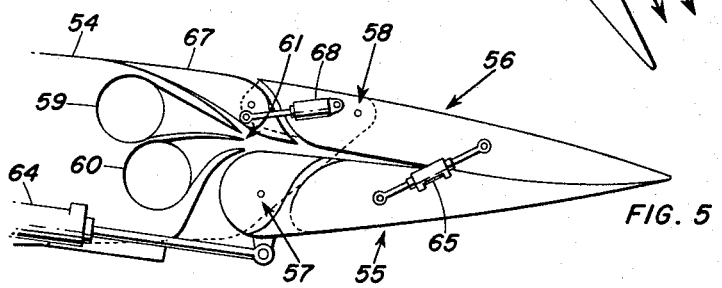
FIGURE 5 is a diagrammatic view of a further embodiment of the invention and shows an alternative form of mounting a hinge arrangement for the diffuser section of the augmenter in order to effect boundary layer control and also shown is an additional passage for entrainment of air which applies generally.
Figure 6:
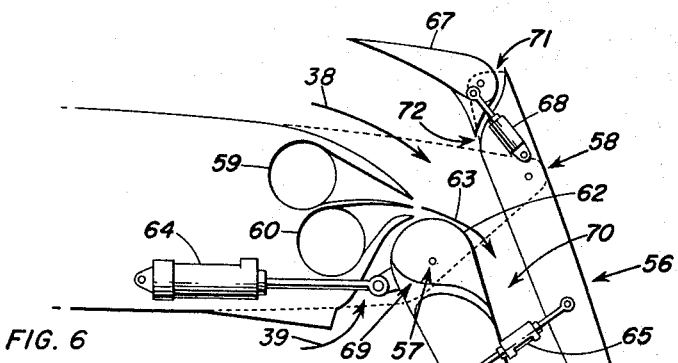
FIGURE 6 is a diagrammatic view of the structure as shown in FIGURE 5 in this case illustrating the configuration or lift by downward direction of the augmenter as well as thrust.

With reference to FIGURE 5 and to FIGURE 6 a further embodiment of the invention is illustrated. In this configuration a fixed wing portion 54 supports a lower flap assembly as at 55 and an upper flap assembly as at 56 hinged at the points 57 and 58 respectively. A pair of bypass air ducts 59 and 60 supply air to the nozzle as at 61 to direct air over the Coanda surface 62 as shown by the arrow 63.

Jack unit 64 acts to alter the flap angle of the flap assemblies 55 and 56 and the jack unit 65 operates to alter the angle of the diffuser section 66. In a manner similar to that as shown in FIGURE 4 an upper fore-flap 67 is provided on the upper flap assembly 56 and is operated by means of the jack unit 68.

In this embodiment a tertiary flow passage as indicated by the arrow 69 is provided in the lower flap assembly 55 which introduces air as at 70 in the downstream portion of the diffuser 66 in order to effect boundary layer control therethrough. This is in addition to the air passage as at 71 which exits at 72, also aiding in the boundary layer control of air passing over the outer surface of the upper flap assembly 56.

In FIGURE 7 is shown a trend curve 73 of the pressure coefficient $C_p$ drawn relative to a high speed wing section contour 74. Curve 73 illustrates conventional upper surface pressure distribution at a given design lift coefficient for flight at high subsonic speeds. It is essential that the adverse pressure gradient portion 75 be gradual to avoid detachment and loss of lift. The invention further provides a pressure distribution as shown in chain lines of effectively the same area but of lower maximum value being spread out toward the trailing edge with a trend to arise in the region 76 under conditions at which the upper and lower rear flaps 42 and 25 respectively are opened in the manner indicated in FIGURE 3 while the thrust gases are passed into the opening from the nozzle structures 28, 29. In these circumstances the drag rise Mach number is substantially increased or alternatively the condition may be expressed as the achievement of considerably higher actual speed without encountering a condition of limiting speed over the airfoil surfaces. Thus one may achieve a higher actual speed with the aircraft before the onset of drag rise due to Mach number. This characteristic can be achieved with the upper and lower diffuser flap construction of the invention in which one of the flaps is mounted relative to the other flap and otherwise independent of the wing section structure itself as in the form illustrated in FIGURES 2 to 4. In the form of the invention illustrated in FIGURES 5 and 6 however both the upper and lower diffuser flaps are hinged relative to the wing section itself and accordingly cannot open except at positive flap angles. In both cases however the provision of a scoop lip on the upper flap enables the gathering in of large quantities of excess air in such manner as to greatly augment the lift characteristics of the system while maintaining attachment over the upper rear surface of the upper flap for effectively all flap angles.

From the foregoing it will be seen that the present invention provides an augmentor wing system incorporating upper and lower flap assemblies defining therebetween a diffuser section and incorporating means for altering the flap angle to effect transition from high speed to low speed flying. An important aspect is provision for rotation of the Coanda surface during transition in order to maintain efficiency of the jump Coanda effect. Additionally means are provided within the flap assemblies to incorporate additional air flow along the air surfaces of the diffuser section to aid in boundary layer control.

A further important aspect of the invention is the provision of means whereby the augmenter slot and diffuser of the system can be opened at a zero flap angle which permits the transition of thrust from the main engine thrust into the augmenter system without creating lift. By this means the first transition of thrust can be effected before the second stage of reduced flying speed by the application of flap angle is applied, all of this transition being done smoothly by careful control of the geometry of the elements during transition and by the introduction of controlling air flows.

The invention also generally concerns the intermediate lift system described which is operative especially at less than cruising speeds to develop the lift component in the wing elements substantially independent of forward speed. In addition, the invention provides for a substantially conventional air foil section at cruising and higher speeds and the intermediate lift system herein at less than cruising speeds operative from bypass air obtained from the jet power plant. Moreover, it is contemplated by the present invention to utilize the zero flap setting at cruising speeds since at this setting no additional lift is created by the augmenter system there being a mere transfer of forward thrust from the main engines into the wing augmenter system.

An essential feature of the invention is the ability to provide pure jet thrust augmentation in the wing augmentation system without producing lift and the ability to convert the pure jet thrust augmentation to partial lift according to the flap angle employed. Thus a flight configuration can be selected from a flexible combination of thrust and lift embracing variable lift forces from zero up to that obtained by maximum flap deflection. The double transition from engine thrust to wing augmenter thrust and from conventional wing lift due to the augmentor system can be accomplished independently and selectively giving complete control of the flight transition from high speed or cruising speed down to low or landing speed.

Referring again to FIGURE 2 further means for assisting the transition from engine thrust at a cruising speed to landing approach speed is provided by means of the engine duct 77 directing air downwardly through the blast nozzle 78. These blow vents on each engine 10 and 11 provide a vertical thrust for the aircraft and may be selectively controlled by suitable valving means to become effective in critical ranges of transition from normal cruising speed to flap assisted landing speed. Various combinations and configurations of the vertical thrust together with flap lift can be accomplished depending upon the particular configuration required.

It will be further understood that although specific embodiments of the invention have herein been described and illustrated, the invention also contemplates such variations as may fall within the scope of the appended claims.

What I claim is:

1. A supplementary lift system for aircraft having port and starboard wing elements and adapted at less than cruising speeds to develop a large lift component with said elements and having rear flap structure for said wing elements comprising: upper and lower rear flap members at least one of which is hinged to its corresponding wing element and means for moving same on said hinge to control flap angles; means normally maintaining said upper and lower flaps in close assembly and controllable to move the upper of said flaps upwardly and forwardly relative to said lower flap; means for projecting thrust gases from said wing elements to a gap defined by the opening of said upper flap relative to said lower flap thereby to induct substantial quantities of air from the upper surfaces of said wing elements to and through said gap; and an independently pivotable scoop lip structure defining the leading edge of the upper flap and adapted controllably to scoop into said gap formed by separation of said flaps, excess air from regions above the airfoil surface contours of the wing elements.

2. The system claimed in claim 1 in which the lower flap is hinged to the wing element and the upper flap is moveable upwardly and forwardly with respect thereto during the introduction to said gap formed thereby of thrust gases whereby to increase the speed of flight of said system before the same is limited by the onset of drag rise due to Mach number.

3. The system claimed in claim 1 in which each of said flaps is independently hinged to the wing element and the separation of said flaps is accomplished due to the movement of same to a positive flap angle.

4. The method of increasing the flight speed of an aircraft airfoil having a rear flap structure, before onset of critical drag rise due to Mach number and comprising: dividing the rear flap structure into upper and lower flap elements; pivotally supporting the rear flap structure on the airfoil; supporting the upper flap element relative to the lower flap element; at sub-sonic speeds and small flap angles moving the upper flap element upwardly and forwardly with respect to the lower flap element to define a gap between the flap elements said gap extending above upper surfaces of the airfoil to scoop exterior airfoil upper surface air into the gap; and directing thrust gases into the gap to induct excess air with scooped air from the upper surface of the airfoil into the gap.

References Cited

UNITED STATES PATENTS

| | | | |
|---|---|---|---|
| 2,466,466 | 4/1949 | Morrisson | 244—42 |
| 2,885,162 | 5/1959 | Griswold | 244—42 |
| 3,045,947 | 7/1962 | Bertin et al. | 244—42 X |
| 3,075,725 | 1/1963 | Dornier | 244—42 X |

FOREIGN PATENTS 856,539   6/1940   France.

MILTON BUCHLER, *Primary Examiner.*

B. BELKIN, *Assistant Examiner.*